(12) United States Patent
Kubo et al.

(10) Patent No.: US 9,967,934 B2
(45) Date of Patent: May 8, 2018

(54) LIGHTING CONTROL POWER SUPPLY

(71) Applicant: CCS Inc., Kyoto-shi, Kyoto (JP)

(72) Inventors: Kento Kubo, Kyoto (JP); Eiji Itou, Kashiba (JP); Yuichiro Tanaka, Kyoto (JP)

(73) Assignee: CCS Inc., Kyoto-shi, Kyoto (JP)

( * ) Notice: Subject to any disclaimer, the term of this patent is extended or adjusted under 35 U.S.C. 154(b) by 0 days. days.

(21) Appl. No.: 15/128,915

(22) PCT Filed: Mar. 25, 2015

(86) PCT No.: PCT/JP2015/059043
§ 371 (c)(1),
(2) Date: Sep. 23, 2016

(87) PCT Pub. No.: WO2015/147025
PCT Pub. Date: Oct. 1, 2015

(65) Prior Publication Data
US 2017/0111968 A1    Apr. 20, 2017

(30) Foreign Application Priority Data

Mar. 28, 2014   (JP) ................................ 2014-069962

(51) Int. Cl.
*G06F 3/02* (2006.01)
*H05B 33/08* (2006.01)
(Continued)

(52) U.S. Cl.
CPC ..... *H05B 33/0842* (2013.01); *G06F 3/04847* (2013.01); *H05B 33/0815* (2013.01); *G06F 3/02* (2013.01); *G06F 3/0362* (2013.01)

(58) Field of Classification Search
CPC ........ G06F 1/26; G06F 3/0486; G06F 3/0482; G06F 3/033; G06F 3/01; G06F 1/1626;
(Continued)

(56) References Cited

U.S. PATENT DOCUMENTS

2008/0117167 A1* 5/2008 Aonuma ............... G06F 3/0325
                                                    345/157
2011/0080110 A1  4/2011 Nuhfer et al.
(Continued)

FOREIGN PATENT DOCUMENTS

CN    102752922 A    10/2012
CN    102958241 A     3/2013
(Continued)

OTHER PUBLICATIONS

ISA Japan Patent Office, International Search Report Issued in Application No. PCT/JP2015/059043, dated May 26, 2015, WIPO, 2 pages.

(Continued)

*Primary Examiner* — Douglas W Owens
*Assistant Examiner* — Syed M Kaiser
(74) *Attorney, Agent, or Firm* — Alleman Hall Creasman & Tuttle LLP

(57) ABSTRACT

In order to provide a lighting control power supply that makes it possible to reduce the number of inputs required for a user when setting each of control parameters, and achieves an intuitive transition between setting input screens of each of control setting items in a plurality of lighting devices, it is configured to, when an input in a first direction is given to an input device, cause a display device to display a setting input screen related to a controller being different than before the input, and it is configured to, when an input in a second direction is given to the input device, cause the display device to display a setting input screen related to the control setting item being different than before the input.

4 Claims, 11 Drawing Sheets

(51) Int. Cl.
*G06F 3/0484* (2013.01)
*G06F 3/0362* (2013.01)

(58) Field of Classification Search
CPC ............ G06F 3/04847; G06F 3/04886; H05B 33/0815; H05B 33/0818; H05B 33/0884; H05B 33/0809; H05B 33/0848; H05B 33/0896; H05B 37/0245; H05B 37/0254; H05B 41/3925; H05B 41/391; H05B 41/2828; H05B 33/0803; H05B 37/0272; H05B 33/0857; H05B 33/0887
USPC ........ 315/130, 294, 297, 307, 122, 192, 224
See application file for complete search history.

(56) References Cited

U.S. PATENT DOCUMENTS

| | | | |
|---|---|---|---|
| 2011/0089857 A1 | 4/2011 | Diederiks | |
| 2012/0122560 A1* | 5/2012 | Loose | G07F 17/32 463/25 |
| 2012/0310428 A1* | 12/2012 | Katagi | H02J 3/008 700/292 |
| 2013/0010209 A1* | 1/2013 | Takiguchi | H04N 21/475 348/739 |
| 2013/0240300 A1* | 9/2013 | Fagan | B66F 3/46 187/210 |
| 2013/0321340 A1* | 12/2013 | Seo | G06F 1/1641 345/174 |
| 2014/0208269 A1* | 7/2014 | Boyana | H04M 1/66 715/835 |
| 2015/0026638 A1* | 1/2015 | Kim | G06F 1/1626 715/810 |
| 2015/0253949 A1* | 9/2015 | Ohmura | G06F 3/011 715/769 |
| 2016/0112667 A1* | 4/2016 | Park | G06F 1/1601 348/739 |

FOREIGN PATENT DOCUMENTS

| | | |
|---|---|---|
| JP | H11298978 A | 10/1999 |
| JP | 2002305089 A | 10/2002 |
| JP | 2006079361 A | 3/2006 |
| JP | 2010257667 A | 11/2010 |

OTHER PUBLICATIONS

European Patent Office, Extended European Search Report Issued in European Application No. 15768619.7, Sep. 20, 2017, Germany, 9 pages.
The State Intellectual Property Office of the People's Republic of China, First Office Action Issued in Chinese Application No. 201580004387.0, dated Jan. 23, 2018, 15 pages. (Submitted with English Translation of First Office Action).

* cited by examiner

LIGHTING CONTROL POWER SUPPLY

TECHNICAL FIELD

The present invention relates to a lighting control power supply that is connected to a plurality of lighting devices and controls light to be irradiated from each of the lighting devices.

BACKGROUND ART

As disclosed in Patent Document 1 or the like, examples of lighting control power supplies include those intended for multi-channel control which are configured to connect a plurality of lighting devices thereto so as to achieve independent control of lighting forms with respect to each of these lighting devices.

For example, when the lighting devices are controlled by pulse-width modulation (PWM) control, control parameters of a plurality of control setting items, such as output voltage, light control value, luminous pattern, luminous width, and luminous delay, need to be set to the lighting control power supply by the number of channels corresponding to the lighting devices.

In general, a display device with this type of lighting control power supply often has a small display region. Taking into consideration visibility or the like of a user, this display device can display only a part of the control parameters about a part of the channels.

Therefore, the conventional lighting control power supply is configured so that a setting input screen on which a control setting item is displayed about a channel is transitionally displayed by a hierarchical structure as shown in FIG. 11.

When an attempt is made to set, for example, a control parameter about a luminous pattern of each of CH1 and CH2 in the case of causing a transition of the setting input screen by the tree-shaped hierarchical structure, it is however, necessary to firstly cause a transition of a setting input screen of the luminous pattern of the CH1 from an initial screen, and then return to the initial screen once and cause a transition of a setting input screen of the luminous pattern of the CH2. Therefore, the user needs to perform too many input operations with respect to a desired number of control parameters while going back and forth between hierarchies by the number of channels. The operations may become complicated. Increasing the number of channels and control setting items makes it difficult for the user to grasp the hierarchical structure as shown in FIG. 11. It is therefore also difficult for the user to intuitively perform the setting of the control parameters.

RELATED ART DOCUMENT

Patent Document

Patent Document 1: Japanese Unexamined Patent Publication No. 2010-257667

SUMMARY OF THE INVENTION

Problems to be Solved by the Invention

The present invention has been made in view of the above problems, and aims at providing a lighting control power supply which makes it possible to decrease the number of inputs required for the user when setting the control parameters, and which enables an intuitive transition between the setting input screens of the control setting items in a plurality of lighting devices.

Solution to the Problems

To be specific, the lighting control power supply of the present invention includes a plurality of controllers disposed correspondingly to a plurality of lighting devices and configured to perform a control of the lighting devices respectively corresponding to the controllers on a basis of each of control parameters being set in units of a plurality of control setting items, a display device configured to display a setting input screen through which a setting input of the control parameters related to the control setting items can be performed, and the setting input screen displays a part of the control setting items with respect to a part of the controllers, an input device configured to be capable of accepting at least an input in a first direction and an input in a second direction that are different from each other, and a setting input screen display part configured to switch the setting input screen displayed on the display device according to an input to the input device. The setting input screen display part is configured to, when the input in the first direction is given to the input device, cause the display device to display a setting input screen related to the controller being different than before the input. The setting input screen display part is configured to, when the input in the second direction is given to the input device, cause the display device to display a setting input screen related to the control setting item being different than before the input.

With the above configurations, the controller to be displayed on the setting input screen is changeable only by giving the input in the first direction to the input device, and the control setting item to be displayed on the setting input screen is changeable only by giving the input in the second direction to the input device. It is therefore possible to display a desired setting input screen with a small number of inputs without going back and forth in the tree-shaped hierarchical structure as in conventional ones. The input directions and objects to be changed are fixed so that only the controller to be displayed on the setting input screen is changed when the input in the first direction is given to the input device, and only the control setting item to be displayed on the setting input screen is changed when the input in the second direction is given to the input device. It is therefore easy for a user to intuitively operate.

In other words, with the present invention, the setting input screen with respect to the control parameters of the control setting items that are already set to the controllers can be displayed in an easy-to-understand manner even on the display device with a small display region, thereby also making it easier for the user to perform a transition to a desired setting input screen.

The lighting control power supply may be used by further adding the lighting devices being initially set. In order that, even in this case, the user can easily set the control parameter of each of the control setting items of an added controller without making any special setting, the setting input screen display part needs to be configured to, when the controller is added, add a setting input screen corresponding to the added controller.

In order to achieve both a transition operation for the setting input screens and a change operation for the control parameter of each of the control setting items without complicating the input device even when the controllers or the control setting items are being displayed on the setting input screen, it is necessary to further include a control parameter change part configured to change a control parameter of a control setting item being displayed on a setting input screen according to the input to the input device, and an input switching part configured to perform switching so that either the setting input screen display part or the control parameter change part functions according to a predetermined input to the input device.

As a specific embodiment suitable for achieving both the transition operation for the setting input screens and the change operation for the control parameter of each of the control setting items by an input device, there is one in which the input device includes an input key to accept the input in the first direction and the input in the second direction, and a switch to accept an input in a push-in direction. The input switching part is configured to, when an input is given to the switch, cause the setting input screen display part and the control parameter change part to switchingly function.

In order that, even when adding a controller for controlling the lighting device, the controller can be added more easily by making it possible to easily change the size of a housing without requiring successive resetting of, for example, the structure of the housing configured to accommodate the controllers therein, it is necessary to further include the housing to accommodate the controllers therein. The housing is made up of a control panel having the display device and the input device disposed thereon and forming a front surface of the housing, two side covers respectively forming right and left side surfaces of the housing, and a plurality of controller holding bodies which respectively form at least a part of an upper surface, a back surface, and a bottom surface of the housing, and which are configured to respectively hold the controllers. Engagement structures to be mutually engaged with each other need to be disposed between the controller holding bodies or between one of the controller holding bodies and the side cover.

Effects of the Invention

With the present invention, the setting input screen display part is configured to display the setting input screen in which either the controller or the control setting item is already changed according to the input in either of the directions given to the input device. Therefore, a desired control parameter can be displayed on the setting input screen by causing desired controller and control setting item to be displayed on the setting input screen with a smaller number of inputs and the intuitive operation in comparison with the case where the setting input screen transition occurs by the tree-shaped hierarchical structure.

BRIEF DESCRIPTION OF THE DRAWINGS

FIG. 5 is a schematic diagram showing setting input screens to be displayed in a display mode in the first embodiment;

FIG. 7 is a schematic diagram showing setting input screens to be displayed in a change mode in the first embodiment;

Figure 10:
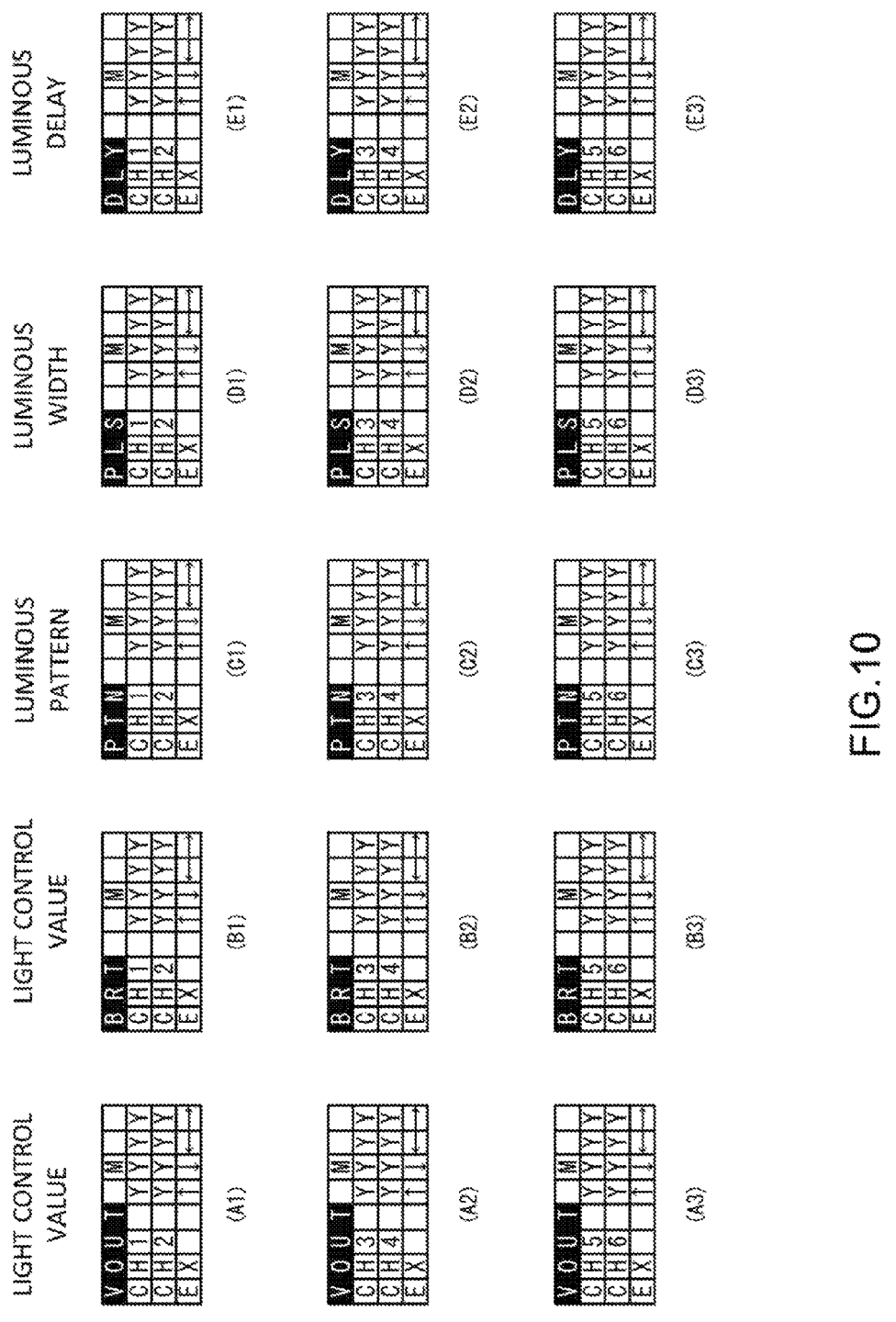

FIG. 10 is a schematic diagram showing automatically added setting input screens in the second embodiment.

Figure 1:
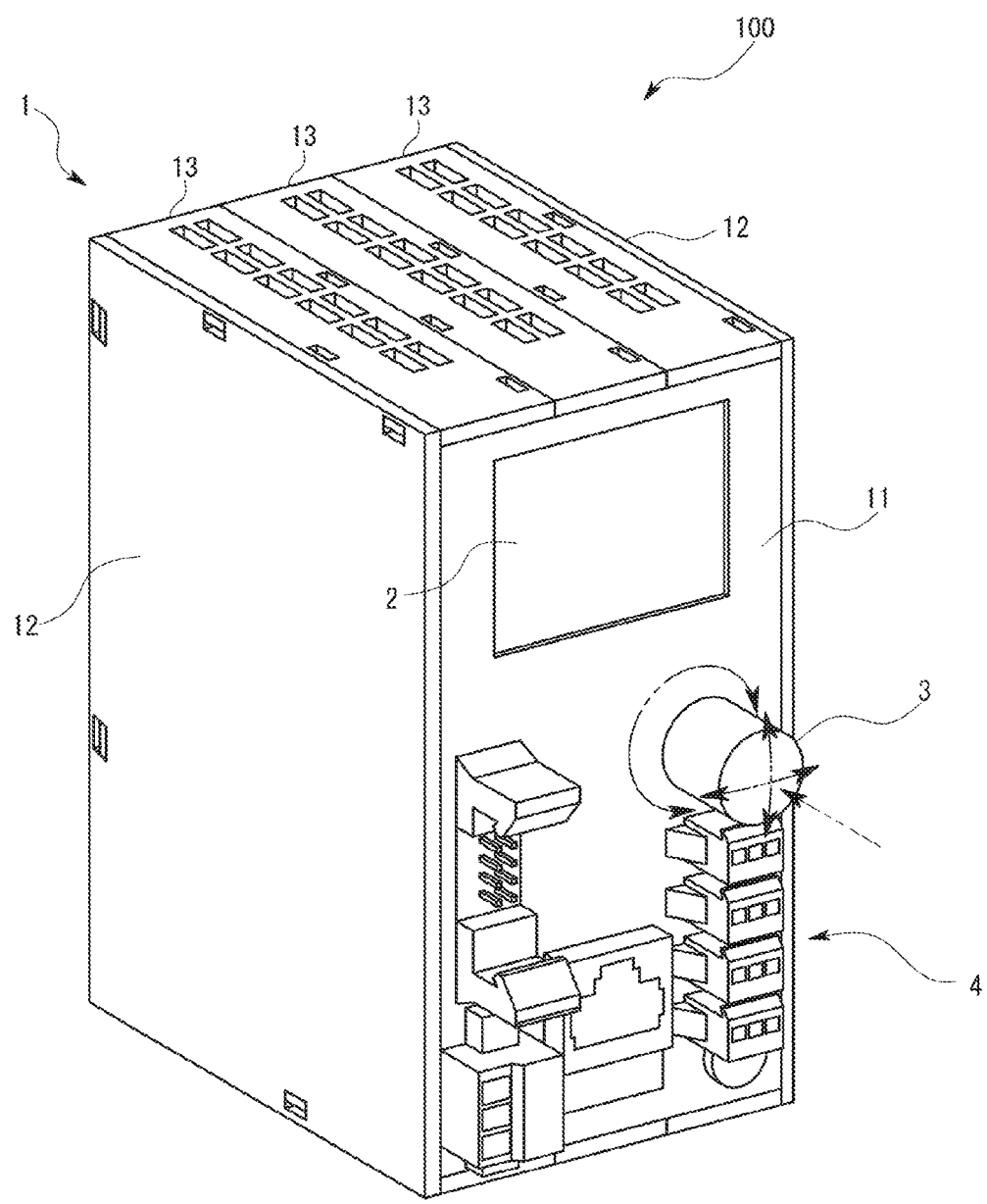
FIG. 1 is a schematic perspective view of a lighting control power supply according to a first embodiment of the present invention.

LIST OF REFERENCE CHARACTERS 100 lighting control power supply
1 housing
11 control panel
12 side cover
13 controller holding body
2 display device
3 input device
31 cross key (input key)
33 switch
5 engagement structure
CB control board (controller)
6 operation board
61 setting input screen display part
62 control parameter change part
63 input switching part

DESCRIPTION OF EMBODIMENTS

A lighting control power supply 100 according to a first embodiment of the present invention is described with reference to FIGS. 1 to 8.

Figure 2:
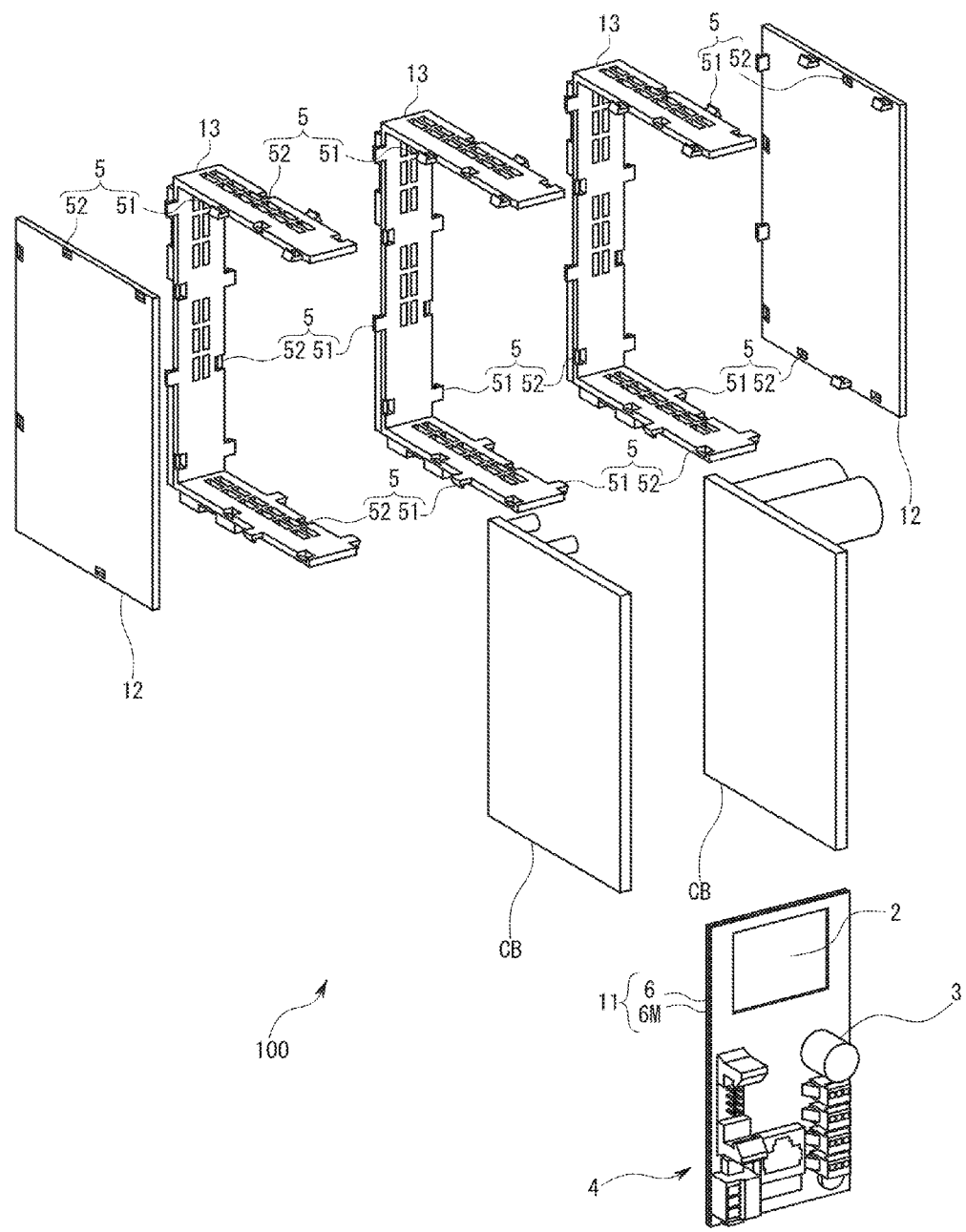
FIG. 2 is a schematic exploded perspective view showing a structure of a housing in the first embodiment.
Figure 3:
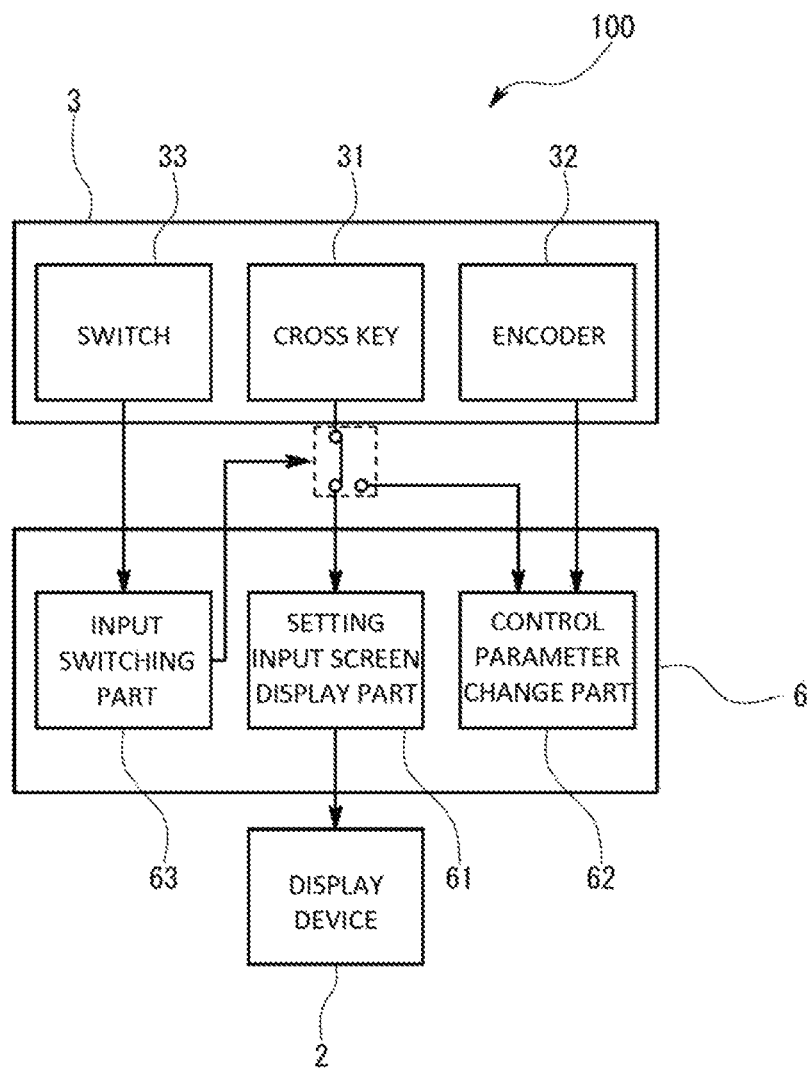
FIG. 3 is a functional block diagram showing functions related to a display of a setting input screen in the first embodiment.

The lighting control power supply 100 of the first embodiment is one intended for multi-channel control which makes it possible to independently control lighting forms with respect to a plurality of lighting devices (not shown) using light-emitting diodes (LEDs). The lighting control power supply 100 has an approximately rectangular parallelepiped shaped housing 1 as shown in FIG. 1, and the housing 1 accommodates therein a plurality of controllers respectively disposed correspondingly to the lighting devices as shown in FIG. 2. Two control boards CB are disposed as the controller in the first embodiment, and two controllers are configured on the single control board CB, thus ensuring that two lighting devices are independently controllable by the single control board CB. In other words, the lighting control power supply 100 shown in FIGS. 1 and 2 is configured as the four-channel lighting control power supply 100. Each of the controllers is configured to perform PWM control of the lighting device. As a control setting item, it is possible to set control parameters at least in terms of output voltage, light control value, luminous pattern, luminous width, and luminous delay.

The housing 1 is made up of a control panel 11 that forms a front surface of the housing 1, two side covers 12 that respectively form right and left side surfaces of the housing 1, and a plurality of controller holding bodies 13 which respectively form at least a part of an upper surface, a back surface, and a bottom surface of the housing 1, and which are configured to hold the control boards CB.

The control panel 11 is made up of a display device 2 that is a liquid crystal display (LCD), an input device 3, an operation board 6 provided with a power terminal to be connected to the lighting device, and input/output means 4, such as communication terminals for establishing a local area network (LAN) connection with an external computer and the like, and a decorative plate 6M disposed so as to cover a front side of the operation board 6.

The input device 3 includes a cross key (input key) 31 to accept an input in a vertical direction (first direction) and an input in a lateral direction (second direction), which are respectively indicated by arrows in FIG. 1, an encoder 32 to accept an input in a rotational direction, and a switch 33 to accept an input in a push-in direction. The input device 3 is an approximately cylindrical one in which the cross key 3, the encoder 32, and the switch 33 are integrated together. A portion of the input device 3 which is projected beyond the control panel 11 is rotatable around a central axis and turnable vertically and laterally.

Three controller holding bodies 13 are used which have the same shape and are formed in an approximately U-shape obtainable by removing one of long sides of a rectangular shape in a side view. Each of the controller holding bodies 13 has a back surface part that forms the back surface of the housing 1, and an upper surface part and a bottom surface part that respectively form the upper surface and the bottom surface of the housing 1. The upper surface part and the bottom surface part are vertically projected with respect to the back surface part so as to face each other. The control board CB is to be inserted from an opening side of the controller holding body 13 and held therein. The side surfaces of the controller holding bodies 13 adjacent to each other are engaged with each other by engagement structures 5 described later so that a lateral length dimension of the housing 1 is adjustable by the number of engagements of the controller holding bodies 13. The upper surface part, bottom surface part, back surface part of each of the controller holding bodies 13 are respectively provided with a plurality of through holes, through which heat generated from the control board CB is discharged to the outside of the housing 1.

As shown in FIG. 2, the single control board CB may be held by and accommodated in the single controller holding body 13, or the single control board CB may be held by and accommodated in the two controller holding bodies engaged with each other, depending on a height of a component, such as a capacitor, on the control board CB. The control boards CB are connected to one another by a connecting wire (not shown). For example, by connecting the leftmost control board CB and the operation board 6, a control parameter being set is displayable on the display device 2, and the control parameter is settable to the control board CM by the input device 3.

The side cover 12 is for closing the interior of the controller holding body 13 by being attached to a side surface thereof.

The engagement structures 5 to be mutually engaged with each other are disposed between the controller holding bodies 13 or between the controller holding body 13 and the side cover 12. When focused on one side surface of one of the controller holding bodies 13 and then viewed along a direction from one end thereof to the other end thereof, an engaging claw 51 and an engaging hole 52 are alternately formed. When the one side surface and another side surface are viewed along a lateral direction, the engaging claw 51 and the engaging hole 52 are disposed so as to face each other on each of the side surfaces.

The housing 1 can be formed by latching the controller holding bodies 13 and the side covers 12 with the engagement structures 5 without carrying out screwing or the like.

Configurations and functions related to a screen display on the display device 2 by the operation board 6 are described below.

The operation board 6 includes, for example, a CPU, a memory, an AC/DC converter, and an input/output means. A display on the display device 2 and setting of control parameters being set to the controller are performed by execution of a program stored in the memory. As shown in a functional block diagram of FIG. 3, the operation board 6 is configured to exert at least functions of an input switching part 63, a setting input screen display part 61, and a control parameter change part 62.

Individual components are described in detail below.

The input switching part 63 is configured to perform switching so that a predetermined input to the input device 3 operates on either the setting input screen display part 61 or the control parameter change part 62. Here, the predetermined input includes at least an input that becomes a trigger when a setting input screen is changed in the input screen display part 61.

Figure 4:
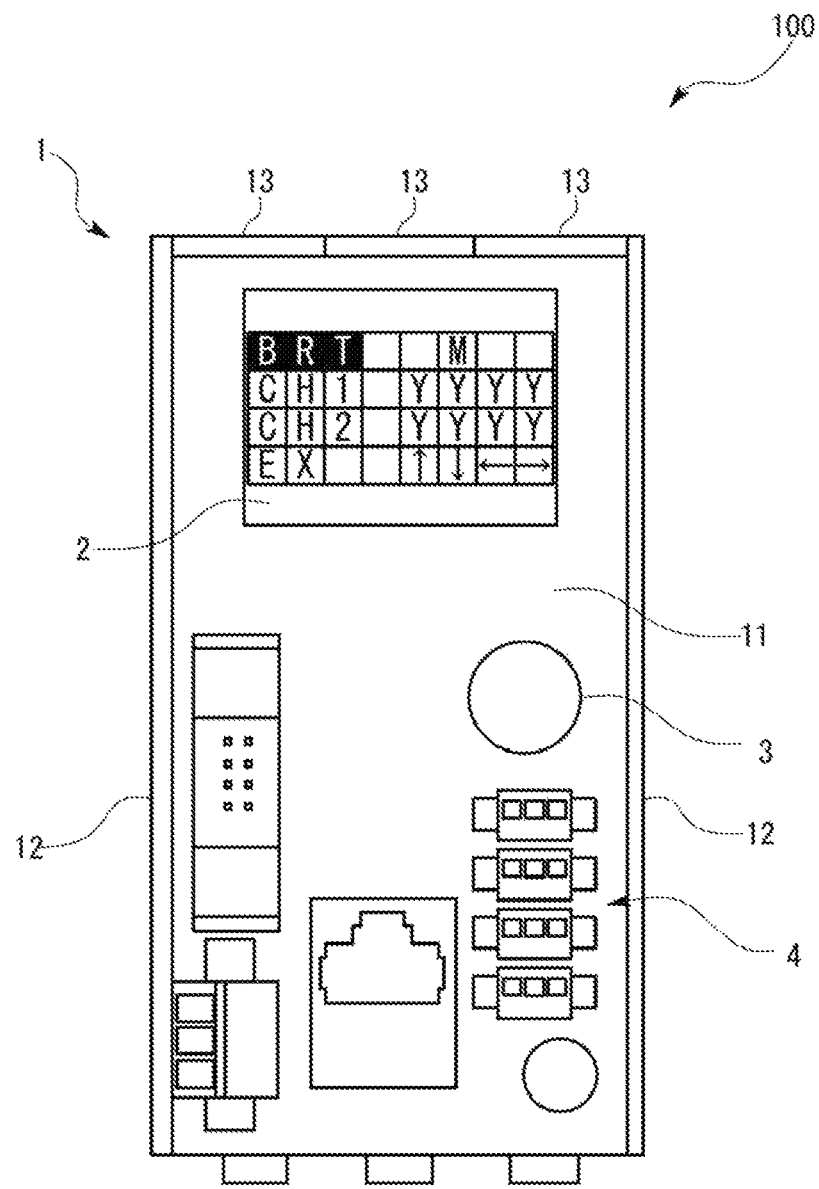
FIG. 4 is an example of displays on a setting input screen in the first embodiment.

The setting input screen display part 61 is configured to switchingly display a setting input screen being displayed on the display device 2 as shown in FIG. 4, according to the input to the input device 3. More specifically, when the input in the first direction is given to the input device 3, the setting input screen display part 61 causes the display device 2 to display a setting input screen obtainable by making a change in terms of the controller to be displayed, to a setting input screen that has been displayed before the input in the first direction is given. When the input in the second direction is given to the input device 3, the setting input screen display part 61 causes the display device 2 to display a setting input screen obtainable by making a change in terms of the control setting item to be displayed, to a setting input screen that has been displayed before the input in the second direction is given.

According to an input to the switch 33 of the input device 3, the setting input screen display part 61 is to be switched to either one of a display mode and a change mode. These modes differ in display change form of a setting input screen with respect to the input to the input device 3.

The control parameter change part 62 is configured to change a portion of the setting input screen which is being selected and reversedly displayed, or a value of a control parameter being selected, on the basis of the input to the input device 3. In the first embodiment, it is configured so that the control parameter change part 62 performs a change operation for the control parameter only when the setting input screen display part 61 is in the change mode. More specifically, the input switching part 63 is configured so that the control parameter change part 62 operates according to an input from the input device 3 only in the change mode.

The configurations of the individual components are described in more detail while describing display of specific setting input screens and screen transition according to the input to the input device 3.

Figure 5:
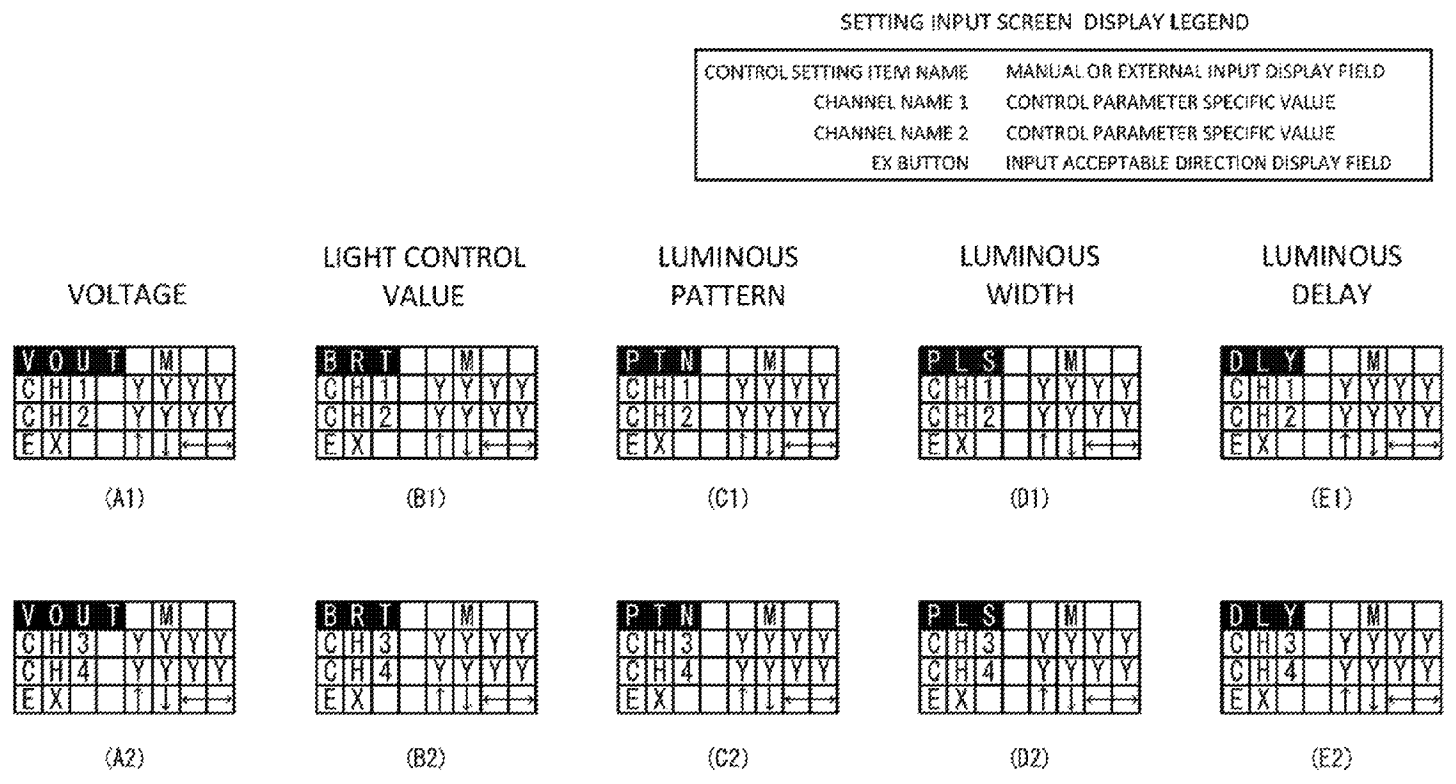

Firstly, the setting input screen display part 61 displays, in the display mode, setting input screens as shown in FIG. 5 in order to display control parameters being set to the control setting items of the controllers (channels). In the first embodiment, it is configured so that a control parameter of a control setting item with respect to two controllers are displayed on the setting input screens. Four channels and five control setting items are provided in the first embodiment. Accordingly, there are ten kinds of setting input screens in the display mode as shown in (A1) to (E2) of FIG. 5. Upon the input to the input device 3, the setting input screen display part 61 causes a transition between the setting input screens shown in FIG. 5 and causes them to be displayed on the display device 2.

The input to the input device 3 in the display mode, and an operation to change the setting input screen by the setting input screen display part 61 are described below with reference to FIG. 6. In order to simplify the description, the transition of the setting input screens between (A1), (B1), (C1), (A2), (B2), and (C2) in FIG. 5 is described here. A similar operation is performed between all the setting input screens in FIG. 5.

Figure 6:
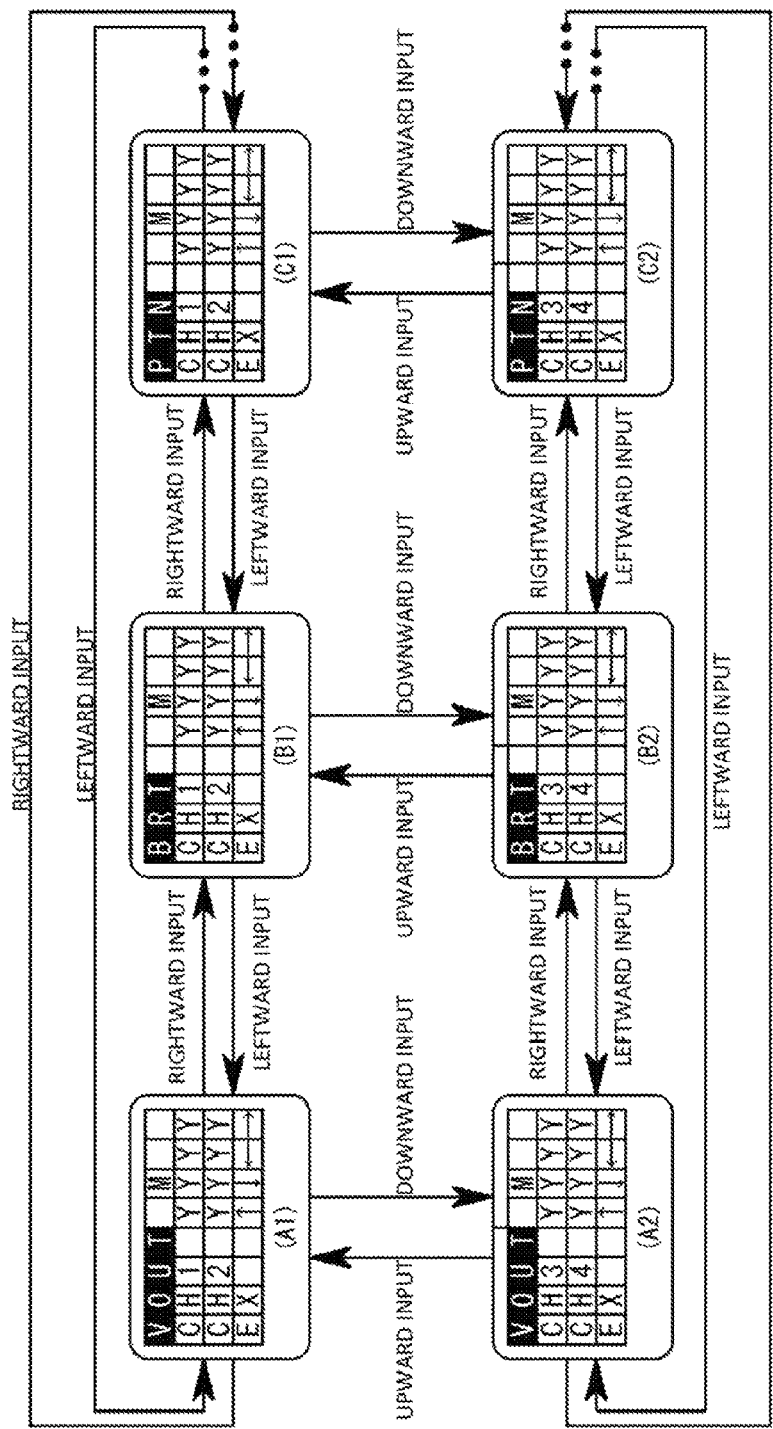
FIG. 6 is a schematic diagram showing a relationship between an input direction and a transition of each of the setting input screens in the display mode in the first embodiment.

The case where a setting input screen of (A1) in FIG. 6 is in an initial state is firstly described. The setting input screen is one on which a display of 4×8 characters is made. As shown in a legend, a first line presents a control setting item name being currently displayed, and an operation status display field that indicates whether the lighting control power supply 100 is in an external operation status by other personal computer or the like, or a manual operation status. A second line presents a control parameter being set to CH1 or CH3. A third line presents a control parameter being set to CH2 or CH4. A fourth line presents an EX button for returning to the display mode and then returning to a top screen for each of the control setting items, and an acceptable direction display region that indicates a direction in which an input through the cross key 31 is acceptable at a present cursor position.

When an input in a downward direction that is the first direction is given to the cross key 31 in a state in which the setting input screen in (A1) is being displayed, the setting input screen display part 61 changes the setting input screen into a setting input screen in (A2) in which the controller to be displayed is already changed while maintaining the control setting item being currently displayed. When an input in an upward direction that is the first direction is given to the cross key 31 in the state of the setting input screen in (A2), switching into (A1) occurs similarly. When an input in the upward direction is given to the cross key 31 in a state in which the setting input screen in (A1) is being displayed, a loop occurs and the setting input screen in (A2) is to be displayed.

When an input in a rightward direction that is the second direction is given to the cross key 31 in the state in which the setting input screen in (A1) is being displayed, the setting input screen is changed into a setting input screen in which the control setting item is already changed from an output voltage (VOUT) to a light control value (BRT) while maintaining the display of the controller. Similarly, by repetitive input in the rightward direction to the cross key 31, the setting input screen display 61 circulatingly displays the setting input screens in (A1), (B1), (C1), (D1), and (E1). This is also true for a leftward input except that the order of the setting input screens is reversed.

Thus, when desired to change a channel on the setting input screen without changing a control setting item, either the upward or downward input to the cross key 31 is needed. When desired to change a control setting item to be displayed on the setting input screen without changing a channel, either the rightward or leftward input to the cross key 31 is needed.

Transitions between the setting input screens in the change mode and the configuration and operation of the control parameter change part 62 are described below.

Figure 7:
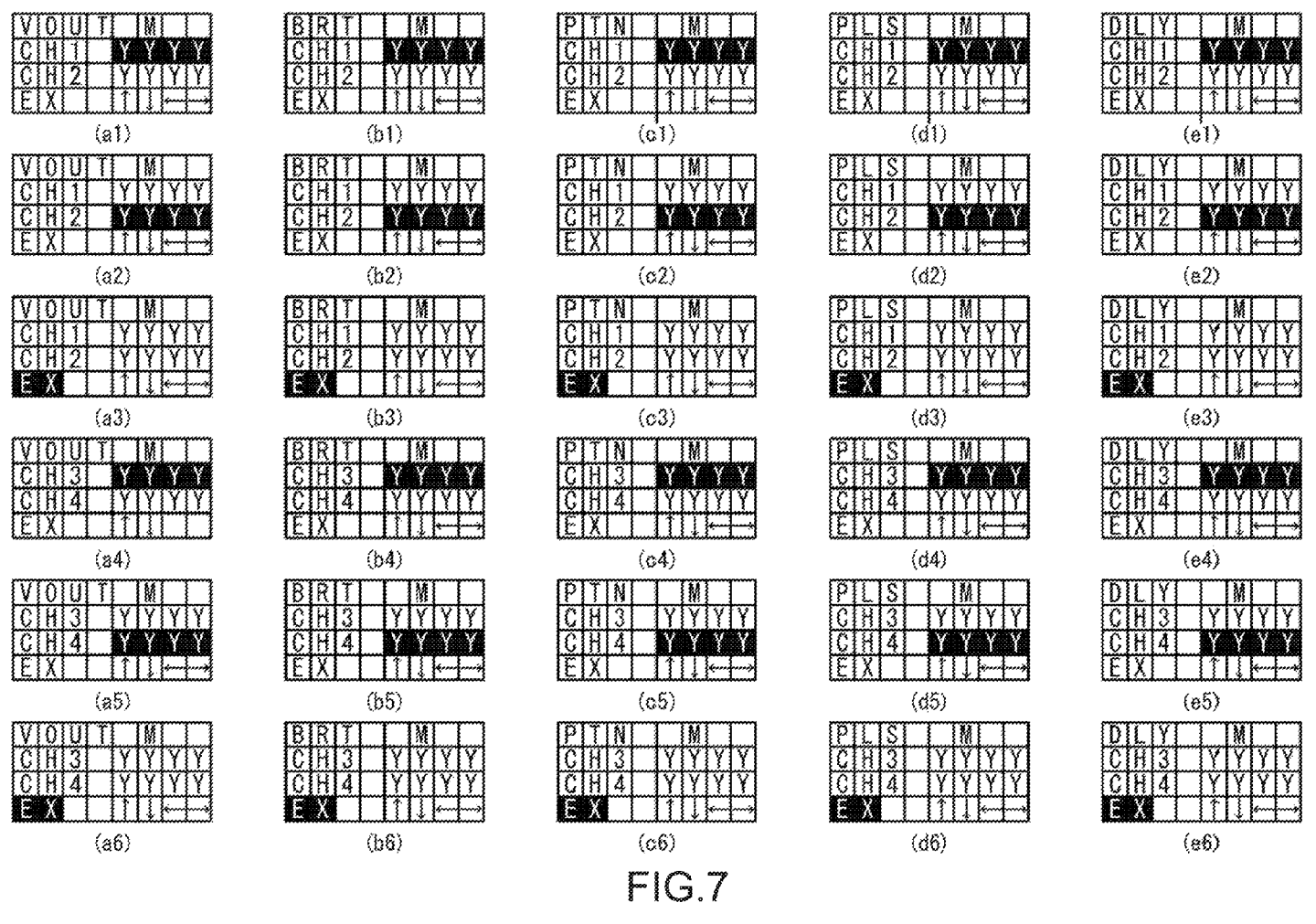
Figure 8:
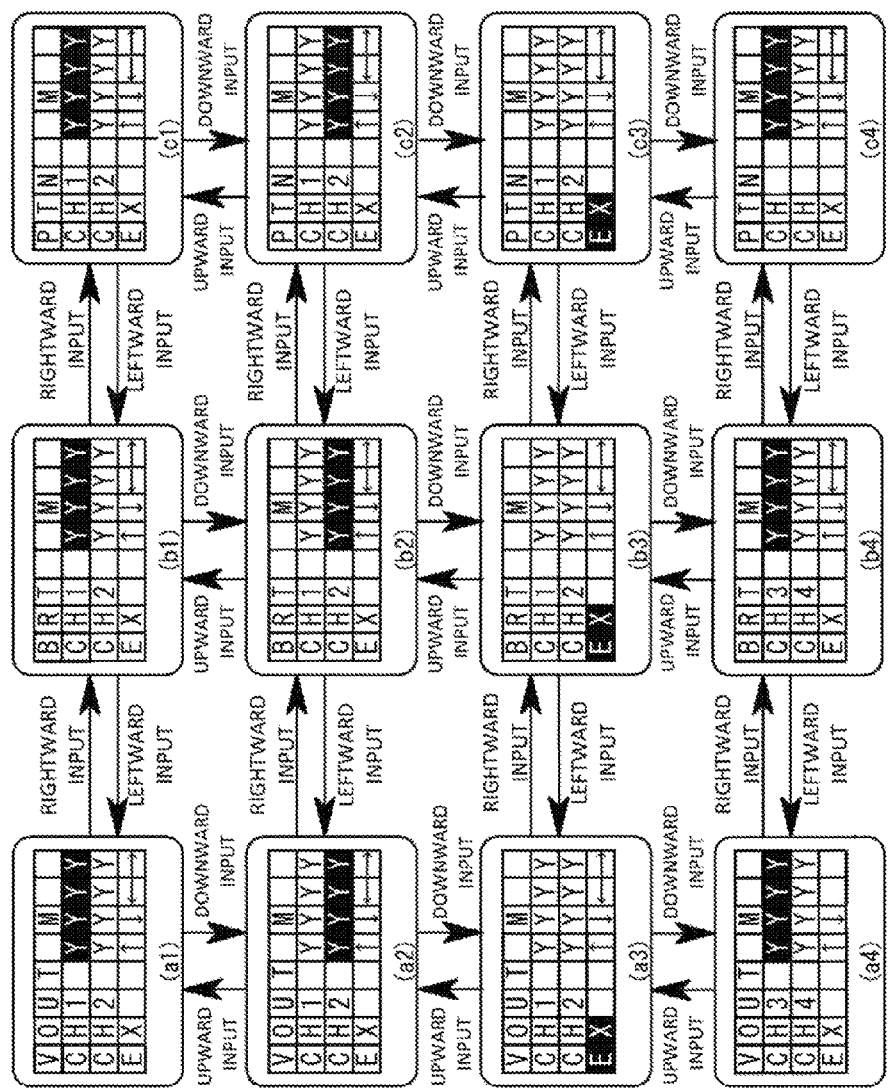
FIG. 8 is a schematic diagram showing a relationship between an input direction and a transition of each of the setting input screens in the change mode in the first embodiment.

When an input is given to the switch 33 in the display mode shown in FIGS. 5 and 6, portions corresponding to outline characters are moved to control parameter portions as shown in FIGS. 7 and 8, thereby making it possible to change the control parameters. In the change mode, there are a total of 30 setting input screen display forms from (a1) to (e6) as shown in FIG. 7. A transition between the setting input screens is performed as shown in FIG. 8. Although only the transition between some of the setting input screens is shown for simplicity in FIG. 8, a similar transition is to be performed between all the setting input screens.

In the change mode, the controller or the control setting item to be displayed on the setting input screen is not necessarily changed by the vertical input to the cross key 31. More specifically, when a cursor is located on the second line and the upward input is given to the cross key 31, or when the cursor is located on the EX button on the fourth line and the downward input is given to the cross key 31, the input switching part 63 causes the upward or downward input to the input device 3 to be operated only on the setting input screen display part 61.

When a lateral input is given to the cross key 31 and it is not in the middle of setting of a control parameter value by the control parameter change part 62, the setting input screen display part 61 displays a setting input screen in which the control setting item is already changed while maintaining the controller to be displayed, as shown in FIG. 8.

That is, in the change mode, an input in a direction away from the screen is already given in a state in which a reversely displayed cursor is located at an end of a screen, and a change of a specific value of a control parameter is not yet started, the input switching part 63 causes an input in a predetermined direction to the input device 3 to be operated only on the setting input screen display part 61. In a case other than the above case in the change mode, the input switching part 63 causes an input to the input device 3 to be operated only on the control parameter change part 62.

Operations of the control parameter change part 62 related to a control parameter change, and changes in screen display are described below.

When an input is given to the switch 33 in a state in which a control parameter being displayed on a setting input screen is being reversely displayed, the control parameter is displayed with a blinking indication. The control parameter change part 62 changes the control parameters being set to the controllers according to the input to the input device 3. In the state in which the control parameter is being displayed with blinking, the control parameter change part 62 changes a digit of the control parameter being selected when a lateral input is given to the cross key 31, and changes a value of the selected digit when a vertical input is given to the cross key 31. Alternatively, the control parameter change part 62 performs an increase or decrease of the control parameter by an input to the encoder 32 of the input device 3 according to a dimension of a rotation angle. When a push-in input is given again to the switch 33, the value of the control parameter being currently selected is established.

Upon completion of setting of the control parameter of the control setting item in the controller for each channel, a transition from the change mode to the display mode occurs by the push-in input to the switch 33 in the state in which the EX button on the fourth line is being reversely displayed, and any one of the setting input screens shown in FIG. 5 is to be displayed.

With the lighting control power supply 100 of the first embodiment, when the input in the vertical direction that is the first direction is given to the cross key 31, the setting input screen display part 61 displays the setting input screen in which the channel is already changed while maintaining the control setting item that has been displayed on the setting input screen before the change. When the input in the lateral direction that is the second direction is given to the cross key 31, the setting input screen display part 61 displays the setting input screen in which the control setting item is already changed while maintaining the controller that has been displayed before the change.

In other words, with the lighting control power supply 100 of the first embodiment, it is possible to make a direct transition between the setting input screens without the need to go back and forth in the hierarchical structures between the setting input screens unlike conventional ones.

Conventional lighting control apparatuses therefore need a large number of inputs for going back and forth in hierarchies when desired to change the controller or the control item to be displayed on the setting input screen. In contrast, with the lighting control power supply 100 of the first embodiment, it is possible to reach the setting input screen that displays a control setting item of a desired controller with a smaller number of inputs.

Instead of the hierarchical structure, a planar transition relationship exists between the setting input screens. Therefore, even when there are a large number of channels and control setting items, it is easier for a user to understand the structure thereof, thereby making it possible to set all the control parameters by an instinctive operation.

Additionally, the first embodiment employs, as the input device 3, an integrated one in which the cross key 31, the encoder 32, and the switch 33 are combined together, thus leading to the simplified input means disposed on the front surface of the lighting control power supply 100. It is also configured so that both the switching between the setting input screens and the change of the control parameters are performable through the input to the input device 3 by the operation of the input switching part 63. Hence, a multifunctional operation is achievable with the simple input means.

Furthermore, even when it is necessary to add the control board CBs (controllers) due to an increased number of lighting devices to be controlled, or it is necessary to change to a bulky control board CB, the lighting control power supply 100 of the first embodiment is capable of adjusting the size of the housing 1 by adding the controller holding body 13.

That is, the lighting control power supply 100 of the first embodiment is capable of solving the problem that whenever the number of lighting devices as a control object is changed, conventional ones have no choice but to newly design the housing 1 according to the change, or increase the number of the housing 1, thus increasing design costs and manufacturing costs.

A lighting control power supply 100 of a second embodiment is described below with reference to FIGS. 9 and 10. Components in the second embodiment, which correspond to the components of the first embodiment, are identified by the same reference numerals.

Figure 9:
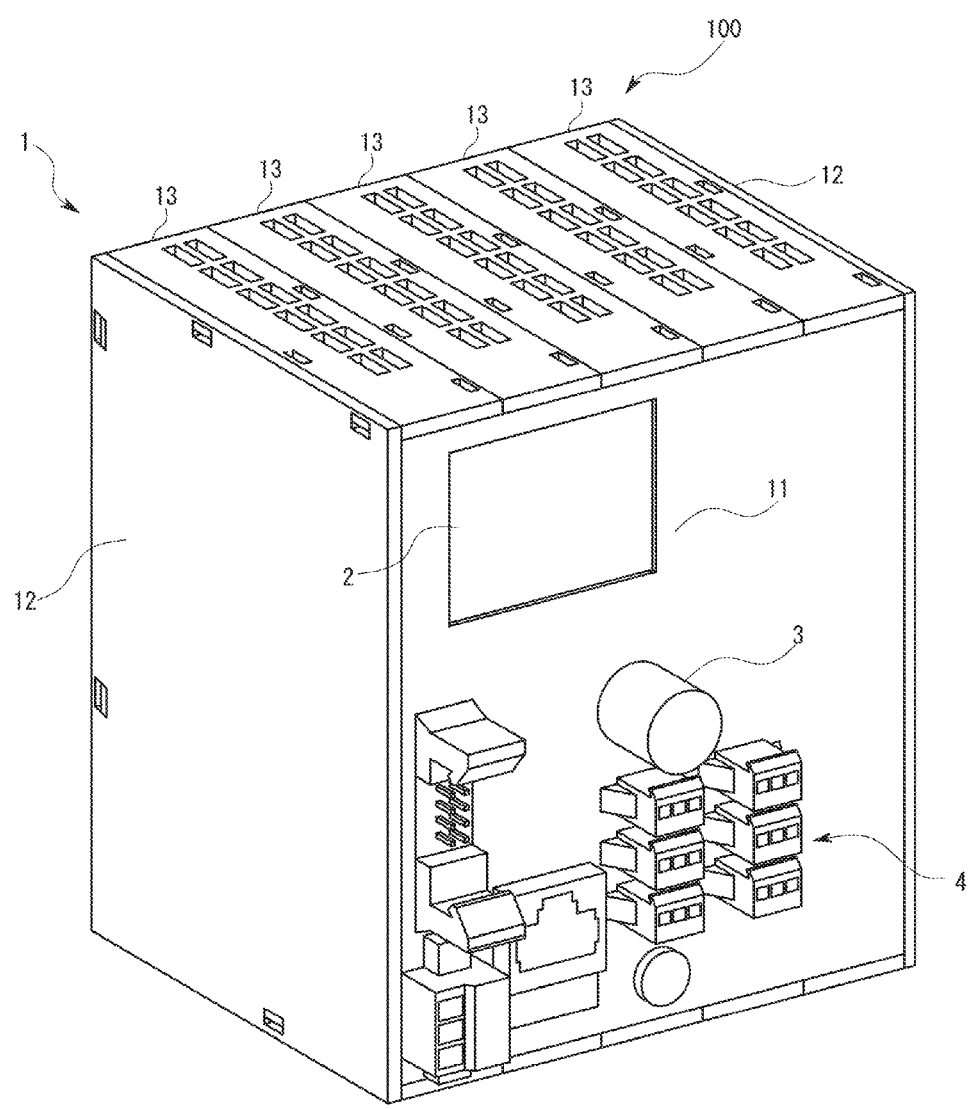
FIG. 9 is a schematic view of a lighting control power supply according to a second embodiment of the present invention.
Figure 11:
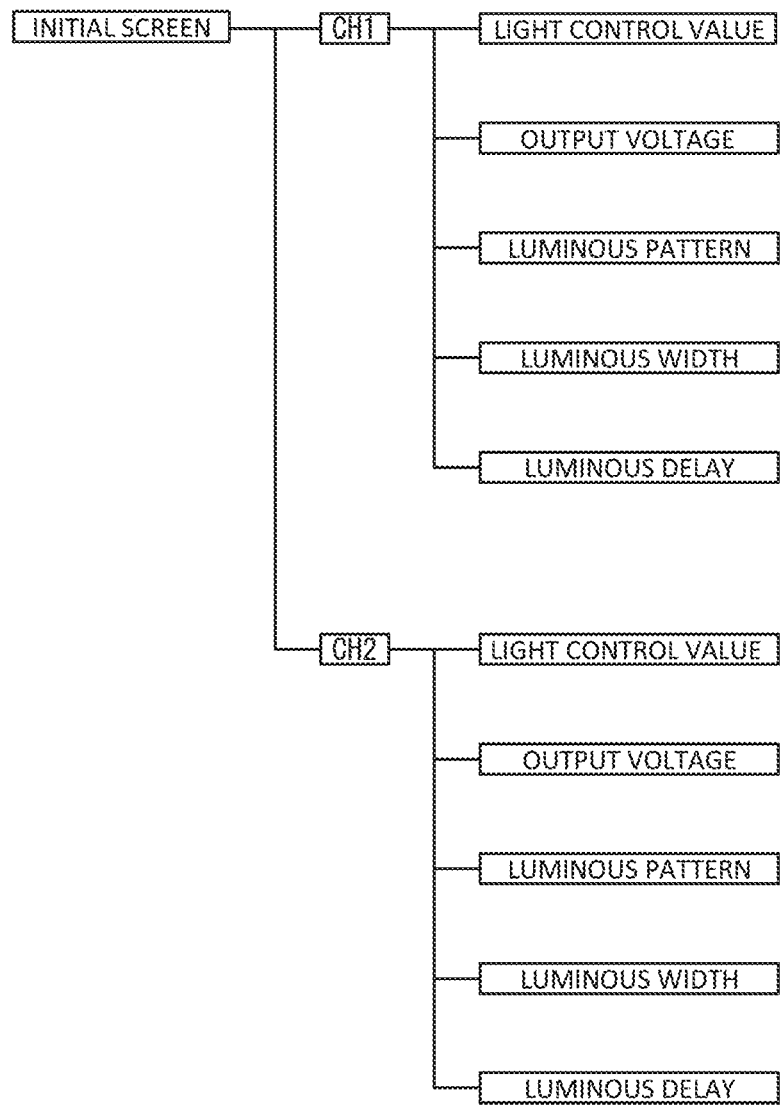
FIG. 11 is a schematic diagram showing a hierarchical structure in a setting input screen transition in a conventional lighting control power supply.

In the lighting control power supply 100 of the second embodiment, the number of the controller holding bodies 13 is increased to increase the number of controllers (the number of channels) accommodated therein as shown in FIG. 9, in comparison with the first embodiment. The decorative plate 6M on the front surface is accordingly subject to change in size.

The configuration of the setting input screen display part 61 is also different from that in the first embodiment. More specifically, the setting input screen display part 61 of the second embodiment is configured to, when each controllers is added, automatically add setting input screens corresponding to the added controller.

In the second embodiment, a controller is added to change the lighting control power supply 100 having the four channels in the first embodiment into the lighting control power supply 100 having six channels. On that occasion, the setting input screen display part 61 automatically adds the setting input screens (A3) to (E3) related to CH5 and CH6 as shown in FIG. 10, and also constructs the transition relationship between the screens as shown in FIG. 6. Hence, with the lighting control power supply 100 of the second embodiment, even when a user adds the controller, the corresponding setting input screen can be added without requiring any special setting, thus maintaining the same sense of use as that before adding the lighting device and the controller.

Although the display mode is illustrated as an example that the setting input screens are automatically added, the setting input screens are to be automatically added according to the addition of the controller, and the transition relationship thereof is to be also automatically constructed even in the change mode as shown in FIGS. 7 and 8.

Other embodiments are described below.

Changing the setting input screens by the setting input screen display part is not limited to the occasion on which the vertical input or the lateral input is given to the cross key. That is, the first direction is not limited to the vertical direction, the second direction is not limited to the lateral direction, and other directions may be set suitably. For example, the rotation direction of the encoder may be set as the first direction or the second direction. When one other than the input device shown in the foregoing embodiments is used, for example, an oblique direction may be set as the first direction or the second direction.

Alternatively, setting may be made so that a direction in which the controllers are disposed side by side coincides with the first direction that is the input direction for switching the controller to be displayed on the setting input screen. In this case, the direction in which the controller are disposed side by side coincides with the input direction with respect to the setting input screen. It is therefore easy to instinctively understand the switching structure for the setting input screens.

The input device is not limited to those illustrated in the foregoing embodiments. For example, the encoder may be omitted. Two controllers may be formed on the single control board. The single controller may be composed of the single control board. Furthermore, the controller is not limited to the control board, and may be a control unit having a housing. For example, the present invention may be used when displaying control parameters of control setting items being set to each control unit in a multi-channel controllable lighting control apparatus formed by stacking a plurality of housings one upon another.

Although the two controllers (channels) and the single control setting item of each of the controllers are displayed on a single setting input screen in the foregoing embodiments, a part of the controllers may be displayed on the setting input screen, and a part of the control setting items may be displayed thereon. More specifically, a controller and a control setting item may be displayed on a setting input screen, or a controller and two control setting items may be displayed on a setting input screen. The setting input screen may be configured so that control parameters of three controllers are respectively displayed with respect to a control setting item. Even in these cases, the switching between the setting input screens is facilitated similarly to the foregoing embodiments by configuring so that only either of the controller and the control setting item to be displayed on the setting input screen is changed when the input in the first direction or the second direction is given to the input device.

Other than the above, various modifications or combinations of the embodiments may be made without departing from the spirit and scope of the present invention.

INDUSTRIAL APPLICABILITY

The present invention is capable of providing the lighting control power supply that makes it possible to easily change a desired control parameter by causing a desired controller and control setting item to be displayed on the setting input screen with a smaller number of inputs and the intuitive operation in comparison with the case where the setting input screen transition occurs by the tree-shaped hierarchical structure.

The invention claimed is:

1. A lighting control power supply comprising:
   a plurality of controllers disposed correspondingly to a plurality of lighting devices, and configured to perform a control of the lighting devices respectively corresponding to the controllers on a basis of each of control parameters being set in units of a plurality of control setting items;
   a display device configured to display a setting input screen through which a setting input of the control parameters related to the control setting items can be performed, and the setting input screen displays a part of the control setting items with respect to a part of the controllers;
   an input device configured to be capable of accepting at least an input in a first direction and an input in a second direction that are different from each other;
   a setting input screen display part configured to switch the setting input screen displayed on the display device according to an input to the input device;
   a control parameter change part configured to change a control parameter of a control setting item being displayed on the setting input screen according to an input to the input device; and
   an input switching part configured to perform switching so that either the setting input screen display part or the control parameter change part functions according to a predetermined input to the input device,
   wherein the setting input screen display part is configured to, when the input in the first direction is given to the input device, cause the display device to display a setting input screen related to the controller being different than before the input, and
   wherein the setting input screen display part is configured to, when the input in the second direction is given to the input device, cause the display device to display a setting input screen related to the control setting item being different than before the input.

2. The lighting control power supply according to claim 1, wherein when each controller is added, the setting input screen display part is configured to add an additional setting input screen corresponding to the controller being added.

3. The lighting control power supply according to claim 1, wherein the input device comprises an input key to accept an input in the first direction and an input in the second direction, and a switch to accept an input in a push-in direction, and
   wherein when the input is given to the switch, the input switching part is configured to cause the setting input screen display part and the control parameter change part to switchingly function.

4. The lighting control power supply according to claim 1, further comprising:
   a housing to accommodate the plurality of controllers therein,
   wherein the housing comprises a control panel having the display device and the input device disposed thereon and forming a front surface of the housing, two side covers respectively forming right and left side surfaces of the housing, and a plurality of controller holding bodies respectively forming at least a part of an upper surface, a back surface, and a bottom surface of the housing, the controller holding bodies being configured to respectively hold the controllers, and
   wherein engagement structures to be mutually engaged with each other are disposed between the controller holding bodies or between one of the controller holding bodies and the side cover.

* * * * *